US008435919B2

(12) United States Patent
Yokota et al.

(10) Patent No.: US 8,435,919 B2
(45) Date of Patent: May 7, 2013

(54) HIGH SPECIFIC SURFACE AREA MIXED OXIDE OF CERIUM AND OF ANOTHER RARE EARTH, PREPARATION METHOD AND USE IN CATALYSIS

(75) Inventors: Kazuhiko Yokota, Hyogo (JP); Naotaka Ohtake, Tokushima (JP)

(73) Assignee: Anan Kasei Co., Ltd., Hyogo (JP)

( * ) Notice: Subject to any disclaimer, the term of this patent is extended or adjusted under 35 U.S.C. 154(b) by 188 days.

(21) Appl. No.: 12/665,852

(22) PCT Filed: Jun. 20, 2008

(86) PCT No.: PCT/JP2008/061689
§ 371 (c)(1),
(2), (4) Date: Mar. 10, 2010

(87) PCT Pub. No.: WO2008/156219
PCT Pub. Date: Dec. 24, 2008

(65) Prior Publication Data
US 2010/0329954 A1 Dec. 30, 2010

(30) Foreign Application Priority Data

Jun. 20, 2007 (FR) ..................................... 07 04400

(51) Int. Cl.
| B01J 23/00 | (2006.01) |
| B01J 23/10 | (2006.01) |
| C01B 13/00 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01C 1/00 | (2006.01) |
| C01D 1/02 | (2006.01) |
| B01D 53/56 | (2006.01) |
| B01D 53/94 | (2006.01) |
| B01J 8/02 | (2006.01) |
| C01G 28/00 | (2006.01) |
| C01G 30/00 | (2006.01) |

(52) U.S. Cl.
USPC ...... 502/304; 502/303; 423/593.1; 423/213.2

(58) Field of Classification Search ............... 423/593.1, 423/213.2; 502/302–304
See application file for complete search history.

(56) References Cited

U.S. PATENT DOCUMENTS

| 5,529,969 | A | 6/1996 | Bonneau et al. |
| 5,712,218 | A * | 1/1998 | Chopin et al. ................ 502/304 |
| 6,090,744 | A * | 7/2000 | Koda et al. ................... 502/304 |
| 6,107,240 | A * | 8/2000 | Wu et al. ...................... 502/304 |
| 6,139,814 | A * | 10/2000 | Shigapov et al. ........... 423/592.1 |
| 6,204,219 | B1 * | 3/2001 | Brezny et al. ................ 502/304 |
| 6,214,306 | B1 | 4/2001 | Aubert et al. |
| 6,228,799 | B1 * | 5/2001 | Aubert et al. ................ 502/304 |
| 6,576,207 | B1 * | 6/2003 | Mussmann et al. .......... 423/212 |
| 7,238,639 | B2 * | 7/2007 | Mussmann et al. .......... 502/304 |
| 7,431,910 | B2 * | 10/2008 | Takao et al. ............. 423/594.12 |
| 7,781,365 | B2 * | 8/2010 | Okamoto ..................... 502/303 |
| 7,820,586 | B2 * | 10/2010 | Hedouin ...................... 502/302 |
| 2005/0119108 | A1 | 6/2005 | Suda et al. |
| 2006/0088463 | A1 * | 4/2006 | Takao et al. .................. 423/263 |
| 2006/0263284 | A1 | 11/2006 | Larcher et al. |
| 2008/0090723 | A1 * | 4/2008 | Okamoto et al. ............ 502/304 |

FOREIGN PATENT DOCUMENTS

| CA | 2459496 | 3/2003 |
| CN | 1177764 A | 4/1998 |
| EP | 0444470 A1 | 9/1991 |
| JP | 04-214026 A | 8/1992 |
| JP | 05-270824 A | 10/1993 |
| JP | 2006-256911 A | 9/2006 |
| JP | 2007-022836 A | 2/2007 |
| JP | 2008-094698 A | 4/2008 |
| WO | 2003076336 A1 | 9/2003 |

OTHER PUBLICATIONS

Canadian Official Action for corresponding Canadian Application No. 2,691,299, dated Sep. 13, 2011.
Chinese Office Action and English Translation for Application 2008800209344 dated Feb. 29, 2012.

* cited by examiner

*Primary Examiner* — Anthony J Zimmer
(74) *Attorney, Agent, or Firm* — Thompson Coburn LLP

(57) ABSTRACT

The mixed oxide of the invention mainly consists of cerium oxide and of at least one oxide of another rare earth. It has a specific surface area of at least 20 m²/g after calcining at 1000° C. for 5 hours. It is obtained by forming a liquid medium comprising a cerium compound; by heating this medium; by adding to the precipitate obtained a compound of the other rare earth, by heating the medium thus obtained and by bringing its pH to a basic value and by calcining the precipitate. The mixed oxide may be used as a catalyst support.

17 Claims, No Drawings

HIGH SPECIFIC SURFACE AREA MIXED OXIDE OF CERIUM AND OF ANOTHER RARE EARTH, PREPARATION METHOD AND USE IN CATALYSIS

TECHNICAL FIELD

The present invention relates to a high specific surface area mixed oxide of cerium and of another rare earth, to its preparation method and to its use in catalysis.

BACKGROUND ART

It is known that ceric oxide may be used as a catalyst or catalyst support. It is also well known that the effectiveness of a catalyst generally increases as the contact area between the catalyst and the reactants increases. In order to achieve this, it is necessary that the catalyst be kept in a state which is as finely divided as possible, that is to say that the solid particles which constitute it are as small and as individualized as possible. The fundamental role of the support is therefore to keep the catalyst particles or crystallites in contact with the reactant, in the most finely divided state possible.

During the prolonged use of a catalyst support, a reduction in the specific surface area occurs due to the coalescence of the porosity of the product. During this coalescence, some of the catalyst is encompassed in the bulk of the support and can no longer be in contact with the reactants.

The known ceric oxides have a specific surface area which decreases rapidly for operating temperatures above 500° C. and which may be very low at even higher temperatures, that is to say between 900° C. and 1000° C. Therefore, these oxides can no longer be used under these temperature conditions.

DISCLOSURE OF THE INVENTION

Problem to be Solved by the Invention

There is therefore a need for ceric oxides which are effective as a catalyst or catalyst support in high temperature ranges.

The object of the invention is to provide such oxides.

Means for Solving Problem

For this purpose, the composition of the invention is of the type mainly consisting of cerium oxide and of at least one oxide of another rare earth, and it is characterized in that it has a specific surface area of at least 20 m²/g after calcining at 1000° C. for 5 hours.

BEST MODE FOR CARRYING OUT THE INVENTION

The composition of the invention thus has a greater surface area even at a particularly high temperature.

Other features, details and advantages of the invention will become even more fully apparent on reading the description which follows and also the concrete but non-limiting examples intended to illustrate it.

For the remainder of the description, the expression "specific surface area" is understood to mean the BET specific surface area determined by nitrogen absorption in accordance with the ASTM D 3663-78 standard established from the Brunauer-Emmett-Teller method described in the periodical "The Journal of the American Chemical Society, 60, 309 (1938)".

Similarly, the expression "rare earth" is understood to mean the elements from the group made up of yttrium and the elements from the Periodic Table with atomic numbers between 57 and 71 inclusive.

Moreover, the calcinations, at the end of which the surface area values are given, are calcinations in air. Furthermore, the specific surface area values which are indicated for a given temperature and a given time correspond, unless otherwise indicated, to calcinations at a temperature hold over the time indicated.

The contents are given as oxides unless otherwise indicated. The cerium oxide is in the form of ceric oxide, the oxides of the other rare earths are in the $Ln_2O_3$ form, unless indicated otherwise, Ln denoting the rare earth.

The composition of the invention mainly consists of cerium oxide and of one or more oxides of a rare earth. In the remainder of the description, use will be made, for convenience, of the terms "rare earth" in the singular, but these terms should be understood, unless otherwise indicated, as applying both to the case where a single rare earth is present in the composition and to the case where several rare earths are also present.

The expression "mainly consists" is understood to mean that the composition in question only contains the oxides of the aforementioned elements, cerium and another rare earth and that it does not contain an oxide of another element, in particular such as zirconium, capable of having a positive influence on the stability of the specific surface area of the composition. On the other hand, the composition may contain elements such as impurities which may especially originate from its preparation method, for example raw materials or starting reactants used.

According to particular embodiments of the invention, the rare earth may be yttrium, neodymium, lanthanum or praseodymium. According to another embodiment, lanthanum and praseodymium are present in combination in the composition.

The content of rare-earth oxide is generally at most 25%, preferably when the rare earth is lanthanum, more particularly at most 20% and preferably at most 15% by weight. The minimum content is not critical but generally it is at least 1%, more particularly at least 2% and preferably at least 5% by weight. This content is expressed as oxide of the rare earth relative to the weight of the whole composition.

The composition of the invention may additionally have a specific surface area of at least 22 m²/g after calcining at 1000° C. for 5 hours. More generally, values of at least around 25 m²/g may be obtained under the same calcination conditions.

The specific surface area of the composition of the invention may remain as high even at a higher temperature still. Thus, this surface area may be at least 10 m²/g, more particularly at least 14 m²/g after calcining at 1100° C. for 5 hours.

Finally, the composition of the invention may have a specific surface area of at least 30 m²/g after calcining at 900° C. for 5 hours. More generally, values of at least around 35 m²/g may be obtained under the same calcination conditions.

The compositions of the invention are also characterized by their porosity. Specifically they have, even at high temperature, porosities which are high and which are provided by pores, the size of which is at most 200 nm. In other words, the compositions of the invention are characterized by a high mesoporosity.

The porosities indicated in the present description are measured by mercury intrusion porosimetry in accordance with the ASTM D 4284-03 standard (Standard method for determining pore volume distribution of catalysts by mercury intrusion porosimetry). More specifically, these compositions have, after calcining at 1000° C. for 5 hours, a porosity provided by pores having a diameter of at most 200 nm which is at least 0.15 cm$^3$/g, more particularly at least 0.2 cm$^3$/g. Moreover, these same compositions may have, after calcining at 1000° C. for 5 hours, a porosity of at least 0.10 cm$^3$/g, more particularly of at least 0.15 cm$^3$/g; this porosity being provided by pores having a diameter of at most 50 nm.

It should also be noted that the compositions of the invention have substantially identical porosities after calcining at 900° C. for 5 hours. In other words, the porosity of the compositions of the invention practically does not vary after calcining at 900° C. then at 1000° C. for 5 hours. This applies most particularly to the porosity provided by the pores of at most 200 nm. Specifically, in this case, the reduction in the porosity is generally at most 10%, preferably at most 5%.

The method for preparing the composition of the invention will now be described.

This method is characterized in that it comprises the following steps:
a liquid medium comprising a cerium compound is formed;
the medium is heated at a temperature of at least 100° C.;
the precipitate obtained at the end of the preceding step is separated from the liquid medium, a compound of the other rare earth is added thereto and another liquid medium is formed;
the medium thus obtained is heated at a temperature of at least 100° C.;
the reaction medium obtained at the end of the preceding heating step is brought to a basic pH; and
the precipitate derived from the preceding step is separated and is calcined.

The first step of the method therefore consists in forming a liquid medium comprising a cerium compound.

The liquid medium is generally water.

The cerium compound is preferably chosen from soluble compounds. It may especially be an organic or inorganic acid salt such as a nitrate, a sulphate, an acetate, a chloride or a ceric ammonium nitrate.

Preferably, ceric nitrate is used. It is advantageous to use salts with a purity of at least 99.5% and more particularly of at least 99.9%. An aqueous ceric nitrate solution can, for example, be obtained by reaction of nitric acid with a hydrated ceric oxide prepared conventionally by reaction of a solution of a cerous salt, for example cerous nitrate, and of an aqueous ammonia solution in the presence of aqueous hydrogen peroxide solution. It is also possible, preferably, to use a ceric nitrate solution obtained according to the method for electrolytic oxidation of a cerous nitrate solution, as described in the document FR-A-2 570 087, and which constitutes in this instance an advantageous starting material.

It should be noted in this instance that the aqueous solutions of cerium salts may exhibit a degree of initial free acidity which can be adjusted by the addition of a base or of an acid. However, it is just as possible to use an initial solution of cerium salts effectively exhibiting a degree of free acidity as mentioned above, as solutions which will have been neutralized beforehand more or less exhaustively. This neutralization can be carried out by addition of a basic compound to the abovementioned mixture, so as to limit this acidity. This basic compound can, for example, be an aqueous ammonia solution or else a solution of alkali metal (sodium, potassium, and the like) hydroxides but preferably an aqueous ammonia solution.

Finally, it should be noted that, when the starting mixture comprises cerium mainly in the III form, it is preferable to involve, in the course of the method, an oxidizing agent, for example aqueous hydrogen peroxide solution.

It is also possible to use a sol as starting compound for the cerium. The term "sol" denotes any system composed of fine solid particles of colloidal dimensions, that is to say of dimensions between approximately 1 nm and approximately 500 nm, based on a cerium compound, this compound generally being a cerium oxide and/or a hydrated cerium oxide in suspension in a liquid aqueous phase, it additionally being possible for said particles optionally to comprise residual amounts of bonded or adsorbed ions, such as, for example, nitrates, acetates, chlorides or ammoniums. It should be noted that, in such a sol, the cerium may be found either completely in the form of colloids or simultaneously in the form of ions and in the form of colloids.

The mixture can without distinction be obtained either from compounds initially in the solid state which will be subsequently introduced into the bottom of a water vessel, for example, or else directly from solutions of these compounds.

The second step of the method consists in heating the medium prepared in the preceding step at a temperature of at least 100° C.

The temperature at which the medium is heated is generally between 100° C. and 150° C., and more particularly between 110° C. and 130° C. The heating operation can be carried out by introducing the liquid medium into a sealed chamber (closed reactor of the autoclave type). Under the temperature conditions given above, and in an aqueous medium, it is thus possible to specify, by way of illustration, that the pressure in the closed reactor can vary between a value of greater than 1 bar (10$^5$ Pa) and 165 bar (1.65×10$^7$ Pa), preferably between 5 bar (5×10$^5$ Pa) and 165 bar (1.65×10$^7$ Pa). The heating can also be carried out in an open reactor for temperatures in the vicinity of 100° C.

The heating can be carried out either in air or under an inert gas atmosphere, preferably nitrogen.

The duration of the heating can vary within wide limits, for example between 30 minutes and 48 hours, preferably between 1 and 5 hours. Likewise, the rise in temperature is carried out at a rate which is not critical and it is thus possible to reach the reaction temperature set by heating the medium, for example, between 30 minutes and 4 hours, these values being given entirely by way of indication.

At the end of the heating step a precipitate is obtained which is separated from the liquid medium by any suitable means, for example by decanting the mother liquors. Added to the precipitate thus separated is a compound of the other rare earth, forming a second liquid medium.

The rare-earth compound may be of the same nature as the cerium compound used in the first step of the method. That which has been described above for this compound therefore applies here to the rare-earth compound which may more particularly be chosen from nitrates, sulphates, acetates and chlorides.

In another step of the method, the second liquid medium is heated at a temperature of at least 100° C.

Here too, that which has been described above for the first heating step likewise applies here for the second heating step.

At the end of this second heating step, the reaction medium obtained is brought to a basic pH. In order to do this, a basic compound is introduced into the reaction medium. It is possible to use, as a base or basic compound, hydroxide type products. Mention may be made of alkali or alkaline-earth metal hydroxides. It is also possible to use secondary, tertiary or quaternary amines. However, amines and aqueous ammonia may be preferred insofar as they reduce the risks of contamination by the alkali or alkaline-earth metal cations. Mention may also be made of urea. The basic compound may more particularly be used in the form of a solution.

The pH value to which the medium is brought may more particularly be between 8 and 10, more particularly 8 and 9.

In a final step of the method according to the invention, the precipitate recovered is subsequently calcined. This calcining makes it possible to develop the crystallinity of the product formed and it can also be adjusted and/or chosen according to the subsequent operating temperature intended for the composition according to the invention, this being done while taking into account the fact that the specific surface area of the product decreases as the calcining temperature employed increases. Such a calcination is generally carried out in air but a calcination carried out, for example, in an inert gas or in a controlled atmosphere (oxidizing or reducing) is very clearly not excluded.

In practice, the calcining temperature is generally limited to a range of values of between 300° C. and 1000° C.

The compositions of the invention can be used as catalysts or catalyst supports. Thus, the invention also relates to catalytic systems comprising the compositions of the invention. For such systems, these compositions can thus be applied to any support commonly used in the field of catalysis, that is to say thermally inert supports in particular. This support can be chosen from alumina, titanium oxide, zirconium oxide, silica, spinels, zeolites, silicates, crystalline silicoaluminium phosphates or crystalline aluminium phosphates.

The compositions can also be used in catalytic systems comprising a coating (wash coat) possessing catalytic properties and based on these compositions, on a substrate of the, for example, metal or ceramic monolith type. The coating can itself also comprise a support of the type of those mentioned above. This coating is obtained by mixing the composition with the support, so as to form a suspension which can subsequently be deposited on the substrate.

These catalytic systems and more particularly the compositions of the invention can have a great many applications. They are therefore particularly well suited to, and thus usable in, the catalysis of various reactions, such as, for example, dehydration, hydrosulphurization, hydrodenitrification, desulphurization, hydrodesulphurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, diesel or petrol engines, demetallation, methanation, the shift conversion or water gas shift or the catalytic oxidation of the soot emitted by internal combustion engines, such as diesel engines or petrol engines operating under lean burn conditions. Finally, the catalytic systems and the compositions of the invention can be used as NO traps or for promoting the reduction of $NO_x$, even in an oxidizing environment.

In the case of these uses in catalysis, the compositions of the invention are employed in combination with precious metals. They thus act as support for these metals. The nature of these metals and the techniques for the incorporation of the latter in the support compositions are well known to a person skilled in the art. For example, the metals can be platinum, rhodium, palladium or iridium. They can in particular be incorporated in the compositions by impregnation.

Among the uses mentioned, treatment of the exhaust gases from internal combustion engines (automobile postcombustion catalysis) constitutes a particularly advantageous application. For this reason, the invention also relates to a method for treating the exhaust gases from internal combustion engines which is characterized in that use is made, as catalyst, of a catalytic system as described above or of a composition according to the invention and as described above.

EXAMPLES

Examples will now be given.

Example 1

This example relates to the preparation of a composition based on cerium oxide and on lanthanum oxide in a proportion, by weight of oxide, of 90/10 respectively.

200 ml of a ceric nitrate solution containing at least 90 mol % of cerium IV ions and containing 50 g of $CeO_2$ were neutralized with 5.1 ml of a 25% aqueous ammonia solution, then diluted with 794.9 ml of pure water. This solution was then heated at 100° C. for 0.5 hour. After removing the mother liquors, 20.5 ml of a lanthanum nitrate solution containing 5.16 g of $La_2O_3$ were added to the medium. Pure water was added to bring the total volume of the solution to 1 liter. The solution was then heated at 120° C. for 2 hours. After cooling the solution to 85° C., a 25% aqueous ammonia solution was added, with stirring, in order to adjust the pH to 8.5. The suspension obtained was filtered over a Nutsche filter to obtain a precipitate. The precipitate was calcined in air at 300° C. for 10 hours to obtain a composition containing 10 wt % of $La_2O_3$ and 90 wt % of $CeO_2$.

Example 2

This example relates to the preparation of a composition based on cerium oxide and on praseodymium oxide in a proportion, by weight of oxide, of 90/10 respectively.

197.6 of a ceric nitrate solution containing at least 90 mol % of cerium IV ions and containing 50 g of $CeO_2$ were neutralized with 5.6 ml of a 25% aqueous ammonia solution, then diluted with 796.8 ml of pure water. This solution was then heated at 100° C. for 0.5 hour. After removing the mother liquors, 11.0 ml of a praseodymium nitrate solution containing 5.25 g of $Pr_6O_{11}$ were added to the medium. Pure water was added to bring the total volume of the solution to 1 liter. The procedure as in Example 1 was then followed to obtain a composition containing 10 wt % of $Pr_6O_1$ and 90 wt % of $CeO_2$.=

Example 3

This example relates to the preparation of a composition based on cerium oxide, lanthanum oxide and praseodymium oxide in a proportion, by weight of oxide, of 90/5/5 respectively.

201.6 ml of a ceric nitrate solution containing at least 90 mol % of cerium IV ions and containing 50 g of $CeO_2$ were neutralized with 5.7 ml of a 25% aqueous ammonia solution, then diluted with 792.7 ml of pure water. This solution was then heated at 100° C. for 0.5 hour. After removing the mother liquors, 6.1 ml of a lanthanum nitrate solution containing 2.63 g of $La_2O_3$ and 5.3 ml of a praseodymium nitrate solution containing 2.63 g of $Pr_6O_{11}$ were added to the medium. Pure water was added to bring the total volume of the solution to 1 liter. The procedure as in Example 1 was then followed to obtain a composition containing 5 wt % of $La_2O_3$, 5 wt % of $Pr_6O_{11}$ and 90 wt % of $CeO_2$.

Example 4

This example relates to the preparation of a composition based on cerium oxide and lanthanum oxide in a proportion by weight of oxide of 80/20 respectively.

197.6 ml of a ceric nitrate solution containing at least 90 mol % of cerium IV ions and containing 50 g of $CeO_2$ were neutralized with 5.6 ml of a 25% aqueous ammonia solution, then diluted with 796.8 ml of pure water. This solution was then heated at 100° C. for 0.5 hour. After removing the mother liquors, 46.1 ml of a lanthanum nitrate solution containing 11.60 g of $La_2O_3$ were added to the medium. Pure water was added to bring the total volume of the solution to 1 liter. The procedure as in Example 1 was then followed to obtain a composition containing 20 wt % of $La_2O_3$ and 80 wt % of $CeO_2$.

Comparative Example 5

This example relates to the preparation, by a coprecipitation method, of a composition based on cerium oxide and lanthanum oxide in a proportion, by weight of oxide, of 90/10 respectively.

35.5 ml of a cerous nitrate solution containing 18 g of $CeO_2$, 7.9 ml of a lanthanum nitrate solution containing 2.0 g of $La_2O_3$ and 356.6 ml of pure water were mixed together. Introduced into this mixture were 400 ml of a 10% aqueous ammonia solution over 10 minutes, with stirring, to precipitate cerium and lanthanum hydroxides. The pH after precipitation was 10. The precipitate was filtered over a Nutsche filter and calcined in air at 300° C. for 10 hours to obtain a composition containing 10 wt % of $La_2O_3$ and 90 wt % of $CeO_2$.

Comparative Example 6

This example relates to the preparation, by a coprecipitation method, of a composition based on cerium oxide and praseodymium oxide in a proportion, by weight of oxide, of 90/10 respectively.

35.5 ml of a cerous nitrate solution containing 18 g of $CeO_2$, 4.0 ml of a praseodymium nitrate solution containing 2.0 g of $Pr_6O_{11}$ and 360.5 ml of pure water were mixed together. Introduced into this mixture were 400 ml of a 10% aqueous ammonia solution over 10 minutes, with stirring, to precipitate cerium and praseodymium hydroxides. The pH after precipitation was 10. The procedure as in Comparative Example 5 was then followed to obtain a composition containing 10 wt % of $Pr_6O_{11}$ and 90 wt % of $CeO_2$.

Comparative Example 7

This example relates to the preparation, by a coprecipitation method, of a composition based on cerium oxide, lanthanum oxide and praseodymium oxide in a proportion, by weight of oxide, of 90/5/5 respectively.

35.5 ml of a cerous nitrate solution containing 18 g of $CeO_2$, 4.0 ml of a lanthanum nitrate solution containing 1.0 g of $La_2O_3$, 2.0 ml of a praseodymium nitrate solution containing 1.0 g of $Pr_6O_{11}$ and 358.5 ml of pure water were mixed together. Introduced into this mixture were 400 ml of a 10% aqueous ammonia solution over 10 minutes, with stirring, to precipitate cerium and praseodymium hydroxides. The pH after precipitation was 10. The procedure as in Comparative Example 5 was then followed to obtain a composition containing 5 wt % of $La_2O_3$, 5 wt % of $Pr_6O_{11}$ and 90 wt % of $CeO_2$.

Given in Table 1 below are the specific surface areas of the products from the various examples.

TABLE 1

| | Specific surface area ($m^2$/g) | | | |
|---|---|---|---|---|
| Example | 300° C. 10 h | 900° C. 5 h | 1000° C. 5 h | 1100° C. 5 h |
| 1 | 234 | 33 | 22 | 15 |
| 2 | 226 | 32 | 20 | 11 |
| 3 | 229 | 34 | 21 | 14 |
| 4 | 185 | 30 | 20 | 11 |
| 5 comparative | 68 | 12 | 6 | 2 |
| 6 comparative | 70 | 6 | 2 | <1 |
| 7 comparative | 71 | 7 | 3 | <1 |

Given in Table 2 below are the porosity characteristics of the products from the various examples.

These porosities were measured with a CE Instruments Pascal 240 machine.

TABLE 2

| | Porosity ($cm^3$/g) | | | |
|---|---|---|---|---|
| | After calcination 900° C. 5 h | | After calcination 1000° C. 5 h | |
| Example | Porosity provided by pores of at most 200 nm | Porosity provided by pores of at most 50 nm | Porosity provided by pores of at most 200 nm | Porosity provided by pores of at most 50 nm |
| 1 | 0.21 | 0.19 | 0.20 | 0.17 |
| 2 | 0.23 | 0.20 | 0.22 | 0.15 |
| 3 | 0.25 | 0.21 | 0.24 | 0.19 |
| 4 | 0.21 | 0.19 | 0.22 | 0.18 |
| 5 comparative | 0.08 | 0.06 | 0.06 | 0.02 |
| 6 comparative | 0.06 | 0.04 | 0.05 | 0.03 |
| 7 comparative | 0.07 | 0.05 | 0.06 | 0.04 |

The invention claimed is:

1. A composition mainly consisting of cerium oxide and of at least one oxide of another rare earth, characterized in that it has a specific surface area of at least 20 m$^2$/g after calcining at 1000° C. for 5 hours.

2. The composition according to claim 1, characterized in that it has a specific surface area of at least 22 m$^2$/g after calcining at 1000° C. for 5 hours.

3. The composition according to claim 1, characterized in that it has a specific surface area of at least 10 m$^2$/g after calcining at 1100° C. for 5 hours.

4. The composition according to claim 1, characterized in that it has a specific surface area of at least 14 m$^2$/g after calcining at 1100° C. for 5 hours.

5. The composition according to claim 1, characterized in that it has a specific surface area of at least 30 m$^2$/g after calcining at 900° C. for 5 hours.

6. The composition according to claim 1, characterized in that the other rare earth is yttrium, neodymium, lanthanum, praseodymium or these last two elements in combination.

7. The composition according to claim 1, characterized in that it has, after calcining at 1000° C. for 5 hours, a pore volume of at least 0.15 cm$^3$/g, provided by pores having a diameter of at most 200 nm.

8. The composition according to claim 1, characterized in that it has, after calcining at 1000° C. for 5 hours, a pore volume of at least 0.10 cm$^3$/g, provided by pores having a diameter of at most 50 nm.

9. The composition according to claim 1, characterized in that it has, after calcining at 1000° C. for 5 hours, a pore volume of at least 0.2 cm$^3$/g provided by pores having a diameter of at most 200 nm.

10. The composition according to claim 1, characterized in that it has, after calcining at 1000° C. for 5 hours, a pore volume of at least 0.15 cm$^3$/g provided by pores having a diameter of at most 50 nm.

11. The composition according to claim 1, wherein the total content of the at least one oxide of another rare earth is at most 25% by weight of the composition.

12. The composition according to claim 1, wherein the total content of the at least one oxide of another rare earth is at most 20% by weight of the composition.

13. The composition according to claim 1, wherein the total content of the at least one oxide of another rare earth is at most 15% by weight of the composition.

14. A method for preparing a composition mainly consisting of cerium oxide and of at least one oxide of another rare earth, characterized in that it has a specific surface area of at least 20 m$^2$/g after calcining at 1000° C. for 5 hours, the method comprising the following steps:

forming a first liquid medium comprising a cerium compound;
heating the first liquid medium to a temperature of at least 100° C. to form a precipitate in the first liquid medium;
separating the precipitate from the first liquid medium;
forming a second liquid medium comprising the separated precipitate and a compound of the other rare earth;
heating the second liquid medium to a temperature of at least 100° C. to form a reaction medium;
adjusting the pH of the reaction medium so that it is brought to a basic pH; and
separating the precipitate from the basic reaction medium and calcining said precipitate to yield the composition mainly consisting of cerium oxide and of at least one oxide of another rare earth.

15. The method according to claim 14, wherein the cerium compound is selected from the group consisting of cerium nitrates, cerium sulphates, cerium acetates, cerium chlorides and ceric ammonium nitrate, and the other rare earth compound is selected from the group consisting of nitrates, sulphates, acetates, and chlorides of the rare earth element.

16. A catalytic system, characterized in that it comprises a composition mainly consisting of cerium oxide and of at least one oxide of another rare earth, characterized in that it has a specific surface area of at least 20 m$^2$/g after calcining at 1000° C. for 5 hours.

17. A method for treating exhaust gas of an internal combustion engine, the method comprising contacting the exhaust gas with a catalyst mainly consisting of cerium oxide and of at least one oxide of another rare earth, characterized in that it has a specific surface area of at least 20 m$^2$/g after calcining at 1000° C. for 5 hours.

* * * * *